US008803864B2

(12) United States Patent
Lee et al.

(10) Patent No.: US 8,803,864 B2
(45) Date of Patent: Aug. 12, 2014

(54) METHOD OF DRIVING A DISPLAY PANEL AND A DISPLAY APPARATUS PERFORMING THE METHOD

(75) Inventors: Woo-Won Lee, Hwaseong-si (KR); Bum-Jin Kim, Cheonan-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 255 days.

(21) Appl. No.: 13/242,042

(22) Filed: Sep. 23, 2011

(65) Prior Publication Data

US 2012/0242639 A1 Sep. 27, 2012

(30) Foreign Application Priority Data

Mar. 25, 2011 (KR) ........................ 10-2011-0026863

(51) Int. Cl.
*G06F 3/038* (2013.01)
*G06F 5/00* (2006.01)

(52) U.S. Cl.
USPC .......................................... 345/211; 345/204

(58) Field of Classification Search
None
See application file for complete search history.

(56) References Cited

U.S. PATENT DOCUMENTS

2008/0001887 A1* 1/2008 Hong et al. ..................... 345/94
2008/0122778 A1* 5/2008 Hiraki et al. .................... 345/98
2008/0316161 A1 12/2008 Song et al.
2011/0128269 A1* 6/2011 Lee et al. ...................... 345/211
2011/0157148 A1* 6/2011 Jang et al. ..................... 345/213
2011/0157158 A1* 6/2011 Hasegawa et al. ............ 345/419

FOREIGN PATENT DOCUMENTS

KR 1020080047072 5/2008
KR 1020090054205 5/2009
KR 1020090086867 8/2009

* cited by examiner

*Primary Examiner* — Joe H Cheng
*Assistant Examiner* — Kwin Xie
(74) *Attorney, Agent, or Firm* — F. Chau & Associates, LLC

(57) ABSTRACT

A method of driving a display panel includes outputting odd-numbered and even-numbered gate signals having a first gate-on voltage during a first period, outputting first data of odd-numbered and even-numbered horizontal lines in response to the odd-numbered and even-numbered gate signals having the first gate-on voltage, outputting odd-numbered or even-numbered gate signals having a second gate-on voltage during a second period, wherein the second gate-on voltage is lower than the first gate-on voltage, and outputting second data of the odd-numbered horizontal lines in response to the odd-numbered gate signals having the second gate-on voltage, or outputting second data of the even-numbered horizontal lines in response to the even-numbered gate signals having the second gate-on voltage.

22 Claims, 7 Drawing Sheets

METHOD OF DRIVING A DISPLAY PANEL AND A DISPLAY APPARATUS PERFORMING THE METHOD

CROSS-REFERENCE TO RELATED APPLICATION

This application claims priority under 35 U.S.C. §119 to Korean Patent Application No. 2011-26863, filed on Mar. 25, 2011, in the Korean Intellectual Property Office (KIPO), the disclosure of which is incorporated by reference herein in its entirety.

BACKGROUND

1. Technical Field

The present invention relates to a method for driving a display panel and a display apparatus performing the method. More particularly, the present invention relates to a method for driving a display panel, wherein the method is capable of enhancing the quality of an image displayed on the panel, and a display apparatus performing the method.

2. Discussion of the Related Art

Generally, a liquid crystal display (LCD) apparatus displays a 2-dimensional (2D) image. Recently, 3-dimensional (3D) image display technology has seen increased application in a variety of fields such as photography, video games, films, television and the like. Accordingly, an LCD apparatus capable of displaying a 3D stereoscopic image has been developed.

Generally, such 3D LCD apparatus allows a viewer to feel the depth (e.g., the 3D effect) of an object by using binocular parallax. Binocular parallax may exist due to the eyes of a person being spaced apart from each other by a predetermined distance, and thus, a 2-D image viewed by the left eye is different from that viewed by the right eye. Thus, the person's brain blends the two different 2D images together to generate a 3D image that is a perspective and realistic representation of the object being viewed through the 3D LCD apparatus.

Techniques for displaying the 3D stereoscopic image may be classified into a stereoscopic method and an auto-stereoscopic method, depending on whether 3D glasses are needed or not. The stereoscopic method uses glasses and may be classified as a passive polarized glasses type or an active shutter glasses type, for example. The auto-stereoscopic method involves installing a lenticular lens, a parallax barrier, etc. in a display device without using glasses, for example.

In the polarized glasses type, the 3D stereoscopic image is displayed by a polarized filter having a polarizing axis different for each of the eyes. In the shutter glasses type, a left image to be seen in the left eye and a right image to be seen in the right eye may be temporally divided to be periodically displayed to a viewer who wears a pair of glasses which open and close a left eye shutter and a right eye shutter in synchronization with the periods of the left and right images.

In the shutter glass type, as the left and right eye images are selectively displayed, charging rates of pixels coupled to an odd-numbered gate line and an even-numbered gate line of the display panel are different from each other. However, the difference in charging rates may cause, by way of crosstalk, data meant to be viewed by the right eye to overlap with data intended for the left eye or vice versa. Accordingly, there exists a need to reduce such data overlap.

SUMMARY

Exemplary embodiments of the present invention provide a method for driving a display panel, wherein the method is capable of improving the quality of an image displayed on the panel.

Exemplary embodiments of the present invention also provide a display apparatus performing the method.

According to an exemplary embodiment of the present invention, a method of driving a display panel includes outputting odd-numbered and even-numbered gate signals having a first gate-on voltage during a first period, outputting first data of odd-numbered and even-numbered horizontal lines in response to the odd-numbered and even-numbered gate signals having the first gate-on voltage, outputting odd-numbered or even-numbered gate signals having a second gate voltage during a second period, wherein the second gate-on voltage is lower than the first gate-on voltage, and outputting second data of the odd-numbered horizontal lines in response to the odd-numbered gate signals having the second gate-on voltage, or outputting second data of the even-numbered horizontal lines in response to the even-numbered gate signals having the second gate-on voltage.

In an exemplary embodiment of the present invention, the first data of the odd-numbered and even-numbered horizontal lines may be image data for a left eye or image data for a right eye.

In an exemplary embodiment of the present invention, the second data of the odd-numbered or even-numbered horizontal lines is image data for the left eye when the first data of the odd-numbered and even-numbered horizontal lines is image data for the left eye, and the second data of the odd-numbered or even-numbered horizontal lines is image data for the right eye when the first data of the odd-numbered and even-numbered horizontal lines is image data for the right eye.

In an exemplary embodiment of the present invention, the method may further include generating the first gate-on voltage and the second gate-on voltage based on a gate-on voltage control signal.

In an exemplary embodiment of the present invention, generating the first gate-on voltage and the second gate-on voltage may include generating the first gate-on voltage in response to the gate-on voltage control signal having a first level, and generating the second gate-on voltage in response to the gate-on voltage control signal having a second level.

In an exemplary embodiment of the present invention, generating the first gate-on voltage and the second gate-on voltage may include receiving a first power voltage and amplifying the first power voltage to the first gate-on voltage in response to the gate-on voltage control signal having the first level, and receiving a second power voltage and amplifying the second power voltage to the second gate-on voltage in response to the gate-on voltage control signal having the second level, wherein the second power voltage is lower than the first power voltage.

In an exemplary embodiment of the present invention, generating the first gate-on voltage and the second gate-on voltage may include dividing a power voltage to generate the first gate-on voltage in response to the gate-on voltage control signal having the first level, and dividing the power voltage to generate the second gate-on voltage in response to the gate-on voltage control signal having the second level.

In an exemplary embodiment of the present invention, the second period corresponds to a first blank period, and when the odd-numbered gate signals having the second gate-on voltage and the second data of the odd-numbered horizontal lines are outputted during the first blank period, the even-numbered gate signals having the second gate-on voltage and the second data of the even-numbered horizontal lines may be outputted during a second blank period. Further, when the even-numbered gate signals having the second gate-on voltage and the second data of the even-numbered horizontal lines are outputted during the first blank period, the odd-numbered gate signals having the second gate-on voltage and the second data of the odd-numbered horizontal lines may be outputted during the second blank period.

According to an exemplary embodiment of the present invention, a display apparatus includes a display panel including a plurality of odd-numbered and even-numbered gate lines and a plurality of data lines crossing the odd-numbered and even-numbered gate lines, a gate driving part and a data driving part, wherein during a first period, the gate driving part outputs odd-numbered and even-numbered gate signals to the odd-numbered and even numbered gate lines, respectively, wherein the odd-numbered and even-numbered gate signals have a first gate-on voltage, and during a second period, the gate driving part outputs odd-numbered gate signals to the odd-numbered gate lines or even-numbered gate signals to the even-numbered gate lines, wherein the odd-numbered or even-numbered gate signals output during the second period have a second gate-on voltage lower than the first gate-on voltage, and during the first period, the data driving part outputs first data of odd-numbered and even-numbered horizontal lines to the data lines in response to the odd-numbered and even-numbered gate signals having the first gate-on voltage, and during the second period, the data driving part outputs second data of the odd-numbered horizontal lines to the data lines in response to the odd-numbered gate signals having the second gate-on voltage, or outputs second data of the even-numbered horizontal lines to the data line in response to the even-numbered gate signals having the second gate-on voltage.

In an exemplary embodiment of the present invention, the first data of the odd-numbered and even-numbered horizontal lines and the second data of the odd-numbered or even-numbered horizontal lines may be image data for a left eye or image data for a right eye.

In an exemplary embodiment of the present invention, the display apparatus may further include a timing controller outputting a gate-on voltage control signal controlling a level of the first and second gate-on voltages.

In an exemplary embodiment of the present invention, the display apparatus may further include a voltage generator generating the first and second gate-on voltages based on the gate-on voltage control signal.

In an exemplary embodiment of the present invention, the voltage generator may generate the first gate-on voltage in response to the gate-on voltage control signal having a first level. The voltage generator may generate the second gate-on voltage in response to the gate-on voltage control signal having a second level.

In an exemplary embodiment of the present invention, the voltage generator may include a power voltage selector receiving a first power voltage in response to the gate-on voltage control signal having the first level. The power voltage selector may receive a second power voltage in response to the gate-on voltage control signal having the second level.

In an exemplary embodiment of the present invention, the power voltage selector may include a first switching element. The first switching element may receive the second power voltage in response to the gate-on voltage control signal.

In an exemplary embodiment of the present invention, the power voltage selector may include a power controller that cuts off the first power voltage in response to the gate-on voltage control signal having the second level.

In an exemplary embodiment of the present invention, the voltage generator may include an amplifier amplifying the first or second power voltages received from the power voltage selector and generating the first or second gate-on voltages.

In an exemplary embodiment of the present invention, the voltage generator may include first and second resistors connected in series. In response to the gate-on voltage control signal having the first level, the voltage generator may divide a power voltage to generate the first gate-on voltage using the first and second resistors.

In an exemplary embodiment of the present invention, the voltage generator may further include a third resistor, and a second switching element selectively connecting the third resistor to the first resistor in parallel in response to the gate-on voltage control signal.

In an exemplary embodiment of the present invention, in response to the gate-on voltage control signal having the second level, the voltage generator may divide the power voltage to generate the second gate-on voltage using the third resistor and the first resistor connected in parallel and the second resistor.

In an exemplary embodiment of the present invention, when the second period corresponds to a first blank period, and when the odd-numbered gate signals having the second gate-on voltage and the second data of the odd-numbered horizontal lines are outputted during the first blank period, the even-numbered gate signals having the second gate-on voltage and the second data of the even-numbered horizontal lines may be outputted during a second blank period. Further, when the even-numbered gate signals having the second gate-on voltage and the second data of the even-numbered horizontal lines are outputted during the first blank period, the odd-numbered gate signals having the second gate-on voltage and the second data of the odd-numbered horizontal lines may be outputted during the second blank period.

According to an exemplary embodiment of the present invention, a method of driving a display panel includes outputting, during a first active period of a frame, first gate signals to a first group of gate lines and second gate signals to a second group of gate lines, wherein the first and second gate signals have a first voltage level; outputting, from a data driving part during the first active period, first data of first and second groups of horizontal lines in response to the first and second gate signals having the first voltage level; outputting, during a first blank period of the frame, third gate signals to the first group of gate lines, wherein the third gate signals have a second voltage level that is lower than the first voltage level; and outputting, from the data driving part during the first blank period, second data of the first group of horizontal lines in response to the third gate signals having the second voltage level.

In an exemplary embodiment of the present invention, when the first group of gate lines is odd-numbered gate lines, the second group of gate lines is even-numbered gate lines and the first group of horizontal lines is odd-numbered horizontal lines and when the first group of gate lines is even-numbered gate lines, the second group of gate lines is odd-numbered gate lines and the first group of horizontal lines is even-numbered horizontal lines.

In an exemplary embodiment of the present invention, the frame includes the first active period, the first blank period, a second active period and a second blank period in sequence and only second data of the second group of horizontal lines is output from the data driving part during the second blank period.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENTS

Hereinafter, exemplary embodiments of the present invention will be explained in detail with reference to the accompanying drawings.

Figure 1:
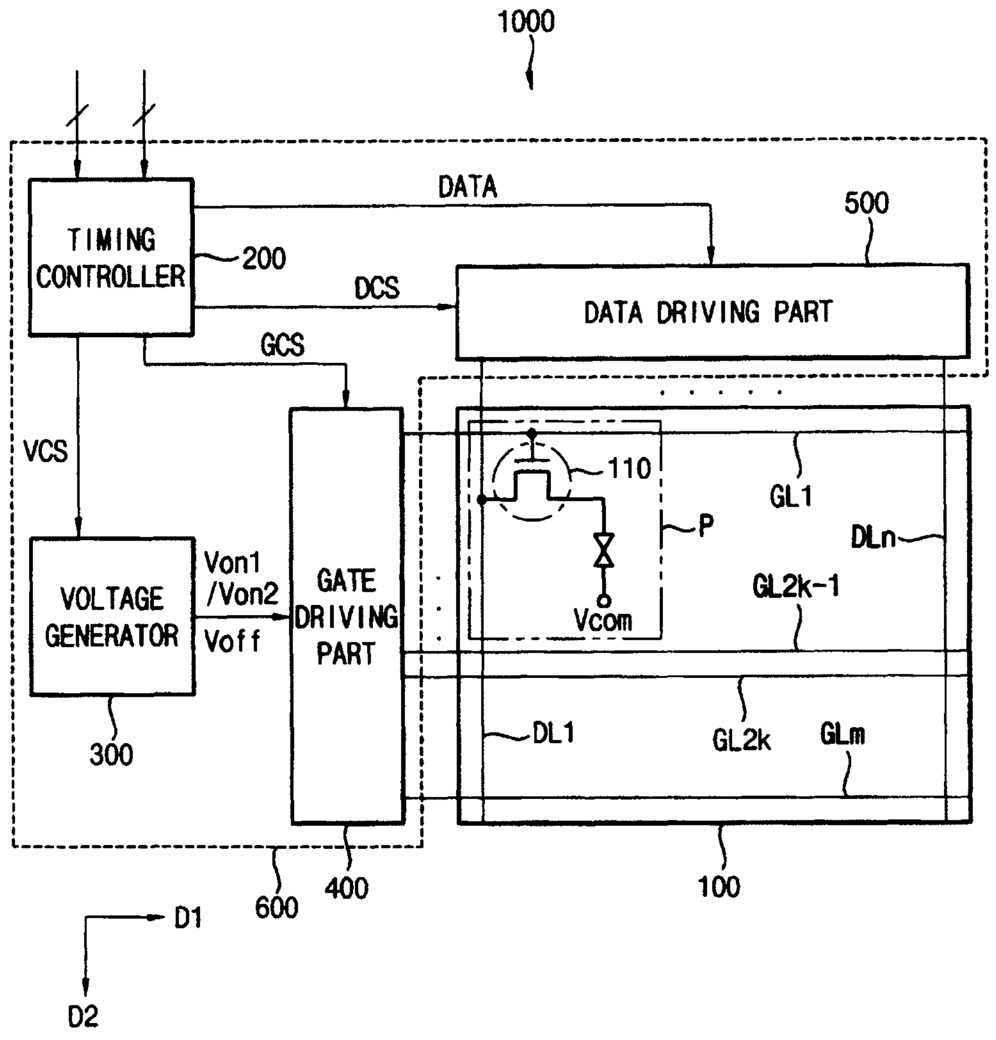
FIG. 1 is a block diagram illustrating a display apparatus according to an exemplary embodiment of the present invention.
Figure 2:
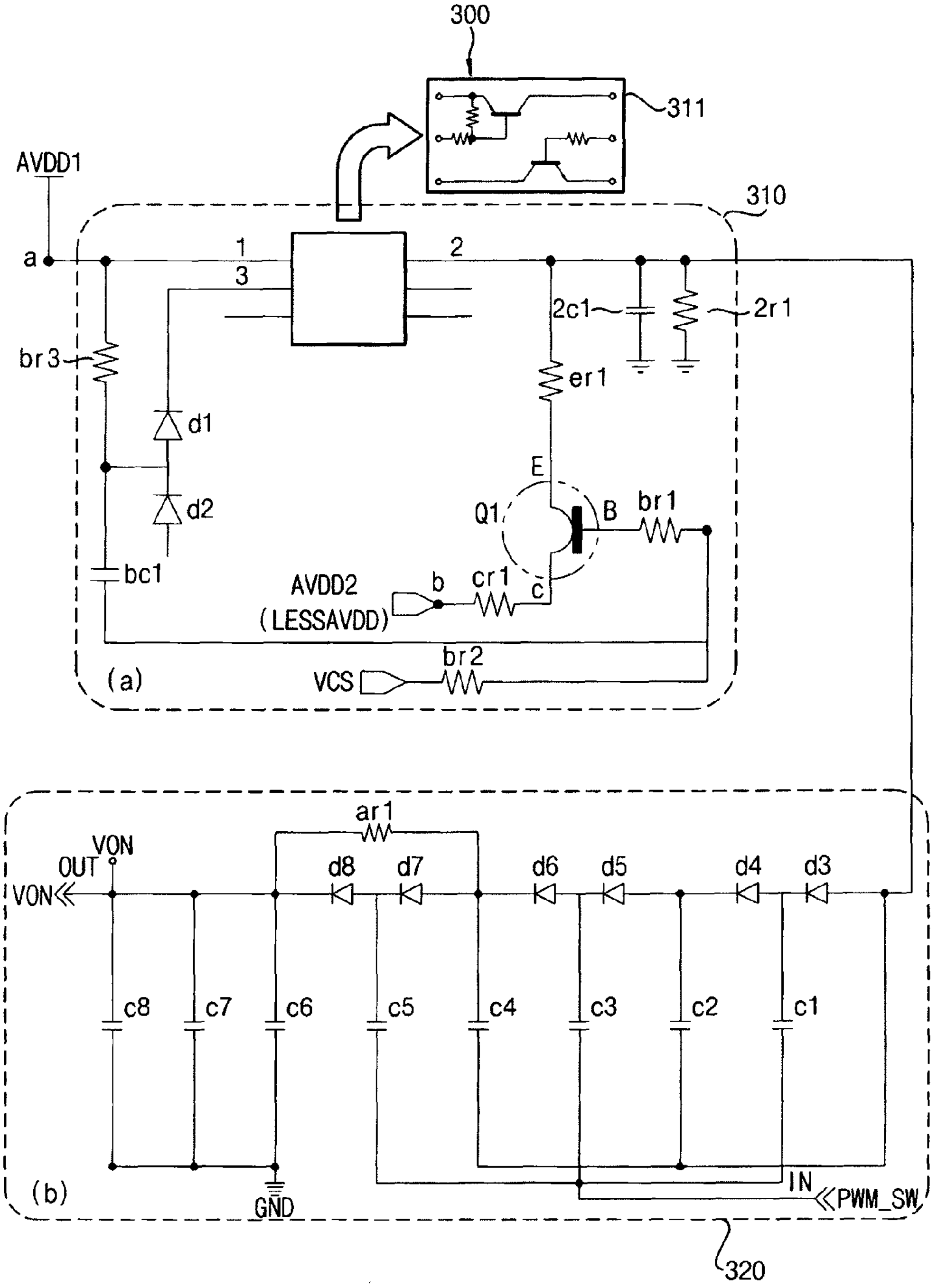
FIG. 2 is a circuit diagram illustrating a voltage generator in FIG. 1, according to an exemplary embodiment of the present invention.

FIG. 1 is a block diagram illustrating a display apparatus according to an exemplary embodiment of the present invention. FIG. 2 is a circuit diagram illustrating a voltage generator in FIG. 1, according to an exemplary embodiment of the present invention.

Referring to FIG. 1, a display apparatus 1000 includes a display panel 100 and a panel driving part 600. The panel driving part 600 may include a timing controller 200, a voltage generator 300, a gate driving part 400 and a data driving part 500.

The display panel 100 displays an image. The display panel 100 includes a plurality of gate lines GL1~GL2*k*−1, which may hereinafter be referred to as "odd-numbered gates lines," and GL2*k*~GLm, which may hereinafter be referred to as "even-numbered gates lines," a plurality of data lines DL1~DLn, and a plurality of pixels P. The gate lines GL1~GL2*k*−1 and GL2*k*~GLm extend along a first direction D1. The data lines DL1~DLn extend along a second direction D2 crossing the first direction D1. Each of the pixels P includes a switching element 110 connected to a gate line GL and a data line DL and a pixel electrode (not shown).

The timing controller 200 generates a gate control signal GCS for controlling the gate driving part 400 and a data control signal DCS for controlling the data driving part 500 in response to a primitive control signal that is provided from the outside.

The timing controller 200 receives image data, and provides the image data as DATA to the data driving part 500 in response to the primitive control signal.

In addition, the timing controller 200 generates a gate-on control signal VCS for controlling the voltage generator 300 in response to the primitive control signal, and provides the gate-on control signal VCS to the voltage generator 300.

The voltage generator 300 generates first and second gate-on voltages Von1 and Von2 and a gate-off voltage Voff based on the gate-on control signal VCS. For example, the voltage generator 300 outputs the first gate-on voltage Von1 having a first level when the gate-on control signal VCS has a low level. The voltage generator 300 outputs the second gate-on voltage Von2 having a second level when the gate-on control signal VCS has a high level. However, the first gate-on voltage Von1 may have the first level when the gate-on control signal VCS has the high level and the second gate-on voltage Von2 may have the second level when the gate-on control signal VCS has the low level. Further, the first gate-on voltage Von1 may have the second level with the gate-on control signal VCS has the low level and the second gate-on voltage Von2 may have the first level when the gate-on control signal VCS has the high level.

The first and second gate-on voltages Von1 and Von2 are applied to the pixels P of the display panel 100. A charging rate of the pixels P may be controlled by a voltage difference between the first and second gate-on voltages Von1 and Von2. Generating and outputting the first and second gate-on voltages Von1 and Von2 will be described in detail hereinafter.

The gate driving part 400 is electrically connected to an end portion of the respective gate lines GL1~GLm. The gate driving part 400 generates a plurality of gate signals using the gate control signal GCS provided from timing controller 200, the first and second gate-on voltages Von1 and Von2 provided from the voltage generator 300 and the gate-off voltage Voff provided from the voltage generator 300. The gate driving part 400 sequentially applies the gate signals to the gate lines GL1~GLm arranged on the display panel 100.

The gate driving part 400 may include a plurality of gate driving ICs (not shown). The gate driving ICs may include a plurality of switching elements. The switching elements may be directly formed on a peripheral area of the display panel 100 by a process which is substantially the same as a process of forming the switching elements 110 of the pixels P.

The data driving part 500 is connected to an end portion of the respective data lines DL1~DLn. The data driving part 500 receives the data DATA provided from the timing controller 200, the data control signal DCS, and gray scale voltages provided from a gray scale voltage generator (not shown). The data driving part 500 converts the data DATA to a data voltage of an analog type based on the gray scale voltages, and applies the data voltage to the respective data lines DL1~DLn arranged on the display panel 100. The data driving part 500 may include a plurality of data driving ICs (not shown).

Figure 3:
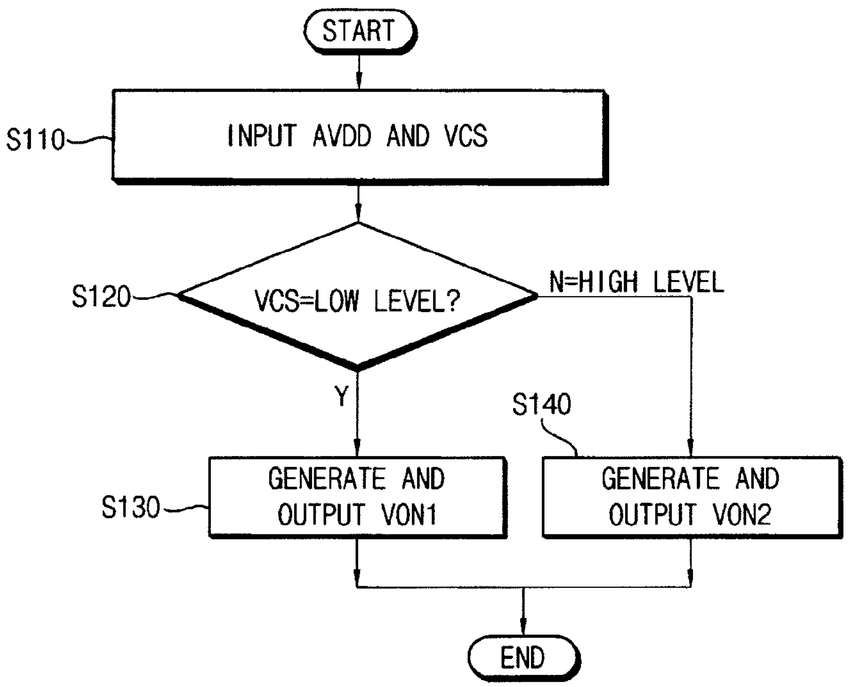
FIG. 3 is a flow chart showing a method for driving the voltage generator in FIG. 1, according to an exemplary embodiment of the present invention.

FIG. 2 is a circuit diagram illustrating a voltage generator in FIG. 1, according to an exemplary embodiment of the present invention. FIG. 3 is a flow chart showing a method for driving the voltage generator in FIG. 1, according to an exemplary embodiment of the present invention.

Referring to FIG. 2, the voltage generator 300 includes a power voltage selector 310 and an amplifying part 320.

The power voltage selector 310 includes first and second power voltage electrodes a and b to which power voltages AVDD from the outside are inputted. The first power voltage electrode a receives a first power voltage AVDD1, and is connected to an electric power controlling element 311. The electric power controlling element 311 may include the transistor-resistor configurations shown in FIG. 2. The electric power controlling element 311 includes an input 1 through which the first power voltage AVDD1 is provided via the first power voltage electrode a and an output 2 through which the first power voltage AVDD1 is output. The second power voltage electrode b receives a second power voltage AVDD2, and is connected to a switching element Q1. For example, the switching element Q1 may be a NPN type transistor. The switching element Q1 may also be a PNP transistor. As shown in FIG. 2, the switching element Q1 includes a base B connected to the gate-on control signal VCS with two resistors br1 and br2 therebetween and the first power voltage electrode a with a capacitor bc1 and resistor br3 therebetween, a collector C connected to the second power voltage electrode b with a resistor cr1 therebetween and an emitter E connected to the output 2 of the electric power controlling element 311 with a resistor er1 therebetween. The output 2 of the electric power controlling element 311 is further connected to a capacitor 2*c*1 and a resistor 2*r*1 each connected to ground. Another input 3 of the electric power controlling element 311 is connected to pair of series connected diodes d1 and d2.

The first power voltage AVDD1 may be larger than the second power voltage AVDD2. For example, the first power voltage AVDD1 is about 11V, and the second power voltage AVDD2 is about 5V.

Referring FIGS. 2 and 3, the voltage generator 300 receives the power voltages AVDD and the gate-on control signal VCS (step S110). The voltage generator 300 identifies a level of the gate-on control signal VCS (step S120).

When the gate-on control signal VCS having the low level is inputted into the voltage generator 300, the switching element Q1 is turned off, and the first power voltage AVDD1 is inputted into the amplifying part 320. The first gate-on voltage Von1 is generated by amplifying the first power voltage AVDD1 inputted into the amplifying part 320 and then the first gate-on voltage Von1 is outputted from the amplifying part 320 (step S130). For example, the first gate-on voltage Von1 may be about 30V. As shown in FIG. 2, the amplifying part 320 may include a plurality of series connected diodes d3-d8, a plurality of capacitors c1-c8 and ground and a resistor ar1 connected between an output of the diode d6 and an output of the diode d8. A power switch PWM_SW may be connected to an input of each of the diodes d4, d6 and d8.

When the gate-on control signal VCS having the high level is inputted into the voltage generator 300, the switching element Q1 is turned on, and the second power voltage AVDD2 is inputted into the amplifying part 320. At this time, the electric power controlling element 311 is turned off to prevent the flow of excessive electric current at the power voltage selector 310. The second gate-on voltage Von2 is generated by amplifying the second power voltage AVDD2 inputted into the amplifying part 320 and then the second gate-on voltage Von2 is outputted from the amplifying part 320 (step S140). For example, the second gate-on voltage Von2 may be about 25V.

Figure 4:
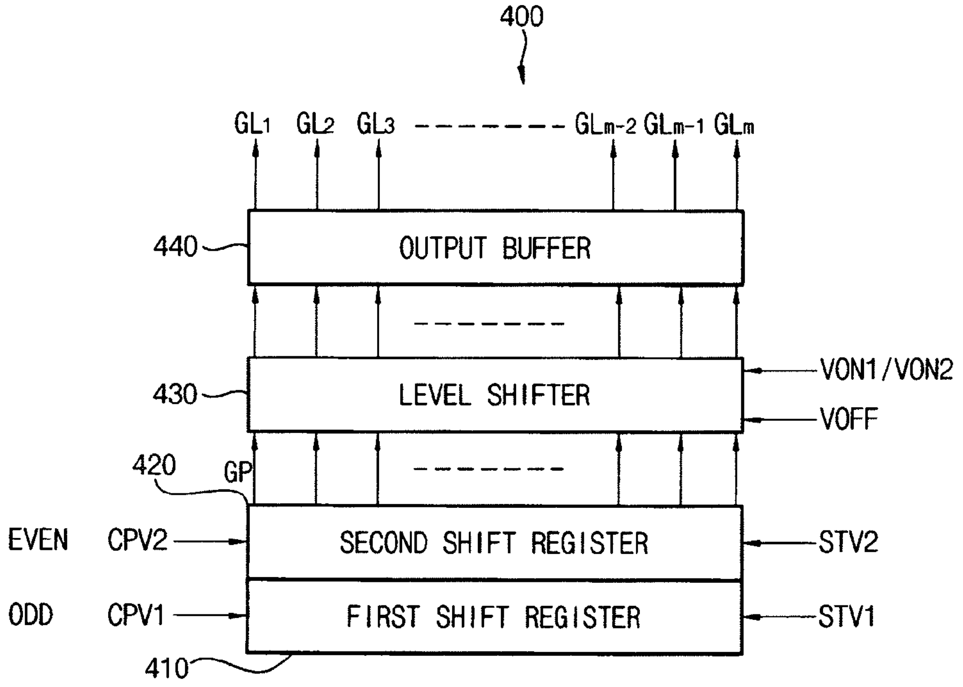
FIG. 4 is a block diagram illustrating a gate driving part in FIG. 1, according to an exemplary embodiment of the present invention.
Figure 5:
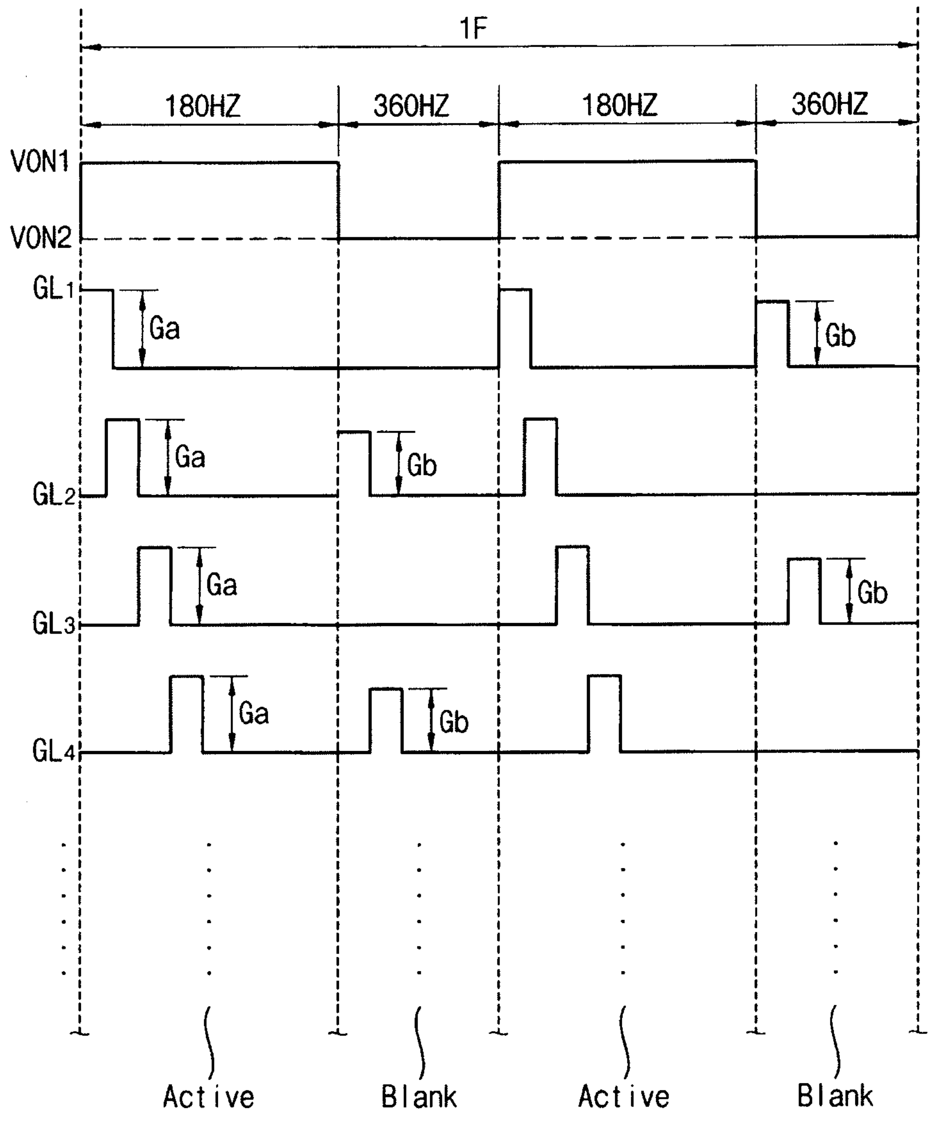
FIG. 5 is a timing diagram illustrating an output waveform of the gate driving part in FIG. 4, according to an exemplary embodiment of the present invention.

FIG. 4 is a block diagram illustrating a gate driving part in FIG. 1, according to an exemplary embodiment of the present invention. FIG. 5 is a timing diagram illustrating an output waveform of the gate driving part in FIG. 4, according to an exemplary embodiment of the present invention.

Referring to FIGS. 4 and 5, the gate driving part 400 includes first and second shift registers 410 and 420, a level shifter 430 and an output buffer 440. Although the first shift register 410 controls odd-numbered gate lines, and the second shift register 420 controls even-numbered gate lines in the present exemplary embodiment, many modifications are possible. For example, the first shift register 410 may control the even-numbered gate lines, and the second shift register 420 may control the odd-numbered gate lines. Further, the first shift register 410 may control a portion of the even-numbered gate lines and a portion of the odd-numbered gate lines and the second shift register 420 may control a portion of the even-numbered gate lines not controlled by the first shift register 410 and a portion of the odd-numbered gate lines not controlled by the first shift register 410.

The gate driving part 400 generates a plurality of gate signals using the first and second gate-on voltages Von1 and Von2 and the gate-off voltage Voff. The gate driving part 400 sequentially applies the gate signals to the gate lines GL1~GLm arranged on the display panel 100.

The gate control signal GCS includes first and second scan starting signals STV1 and STV2 and first and second clock signals CPV1 and CPV2.

The first shift register 410 receives the first scan starting signal STV1 and the first clock signal CPV1. The second shift register 420 receives the second scan starting signal STV2 and the second clock signal CPV2. The first clock signal CPV1 and the second clock signal CPV2 may be different signals having a delay difference.

The first and second shift registers 410 and 420 sequentially output gate pulses GP. The gate pulses GP generate the gate signals applied to the gate lines GL1~GL2*k*−1 and GL2*k*~GLm based on the first and second scan starting signals STV1 and STV2 and the first and second clock signals CPV1 and CPV2. The first shift register 410 generates odd-numbered gate pulses GP generating the odd-numbered gate signals, and the second shift register 420 generates even-numbered gate pulses GP generating the even-numbered gate signals. The level shifter 430 receives the first and second gate-on voltages Von1 and Von2 and the gate-off voltage Voff from the voltage generator 300, and receives the gate pulses GP from the first and second shift registers 410 and 420 to generate the gate signals.

The output buffer 440 amplifies the gate signals received from the level shifter 430 and sequentially applies the amplified gate signals to the gate lines GL1~GL2*k*−1 and GL2*k*~GLm. When the gate-on voltage control signal VCS has the low level, the output buffer 440 applies a first gate signal Ga to respective odd-numbered and even-numbered gate lines GL1~GL2*k*−1 and GL2*k*~GLm, for example, GL1-GL4 during the first 180 Hz drive period of frame 1F shown in FIG. 5 and GL1-GL4 during the second 180 Hz drive period of the frame 1F shown in FIG. 5. When the gate-on voltage control signal VCS has the high level, the output buffer 440 applies a second gate signal Gb to respective odd-numbered or even-numbered gate lines GL2*k*−1 or GL2*k*, for example, G2 and G4 during the first 360 Hz drive period of the frame 1F shown in FIG. 5 and G1 and G3 during the second 360 Hz drive period of the frame 1F shown in FIG. 5. The first gate signal Ga has a voltage larger than that of second gate signal Gb. This can be evidenced by the amplitudes of the first and second gate signals Ga and Gb shown in FIG. 5.

Figure 6:
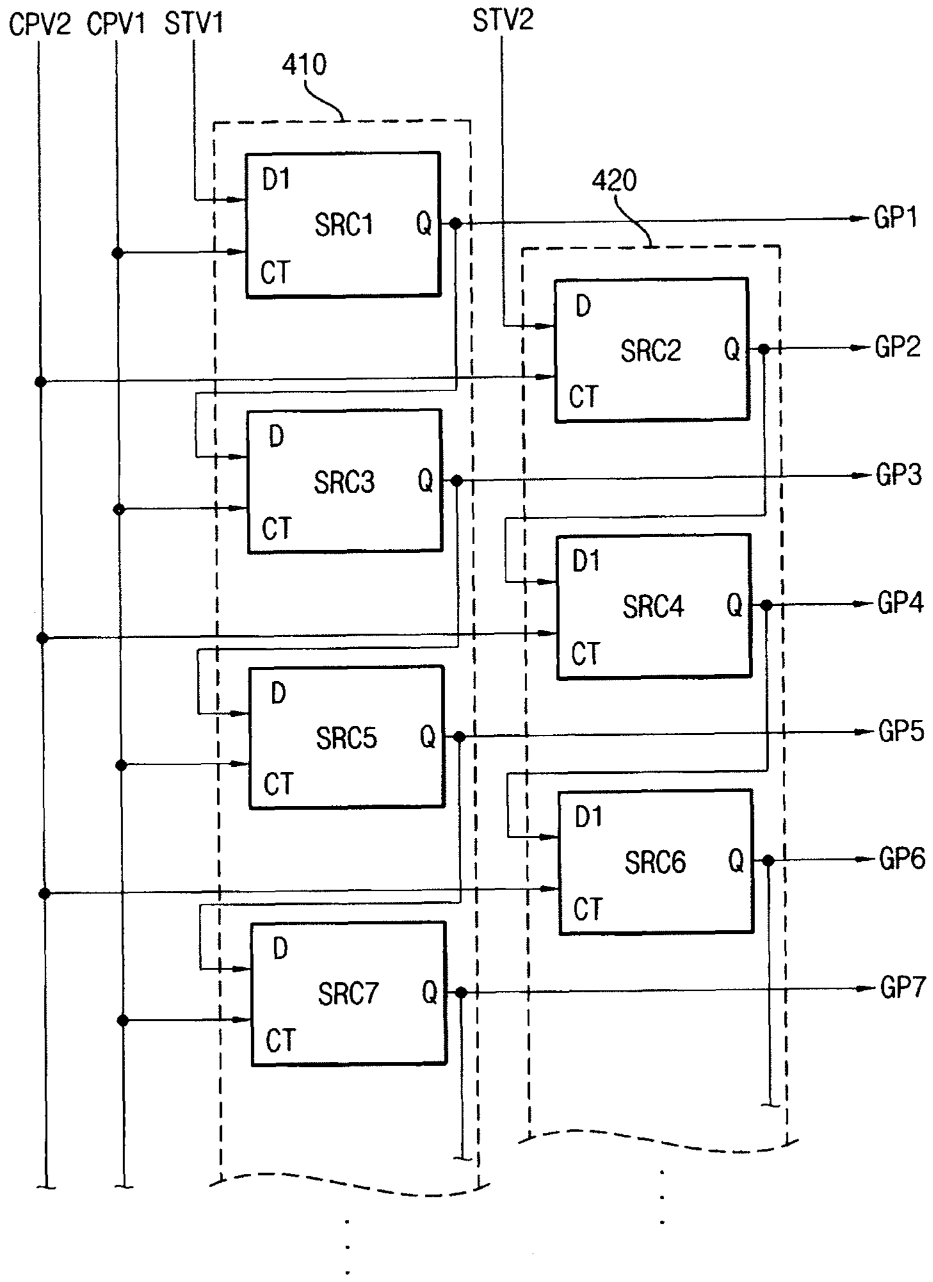
FIG. 6 is a block diagram illustrating first and second shift registers, according to an exemplary embodiment of the present invention.

FIG. 6 is a block diagram illustrating first and second shift registers, according to an exemplary embodiment of the present invention.

The first shift register 410 includes a plurality of odd-numbered stages SRC1, SRC3, SRC5, and receives the first scan starting signal STV1 and the first clock signal CPV1.

Each of the odd-numbered stages SRC1, SRC3, SRC5 includes an input terminal D, a clock terminal CT and an output terminal Q, and may be a D flip flop (D-FF: Data Flip Flop). The input terminal D receives the first scan starting signal STV1 or an output signal from a previous stage. The clock terminal CT receives the first clock signal CPV1. The output terminal Q outputs odd-numbered gate pulses GP1, GP3 . . . synchronized with the first clock signal CPV1.

The second shift register 420 includes a plurality of even-numbered stages SRC2, SRC4, SRC6 . . . , and receives the second scan starting signal STV2 and the second clock signal CPV2.

Each of the even-numbered stages SRC2, SRC4, SRC6 . . . includes an input terminal D, a clock terminal CT and an output terminal Q, and may be a D flip flop (D-FF: Data Flip Flop). The input terminal D receives the second scan starting signal STV2 or an output signal from a previous stage. The clock terminal CT receives the second clock signal CPV2. The output terminal Q outputs even-numbered gate pulses GP2, GP4 . . . synchronized with the second clock signal CPV2.

Figure 7:
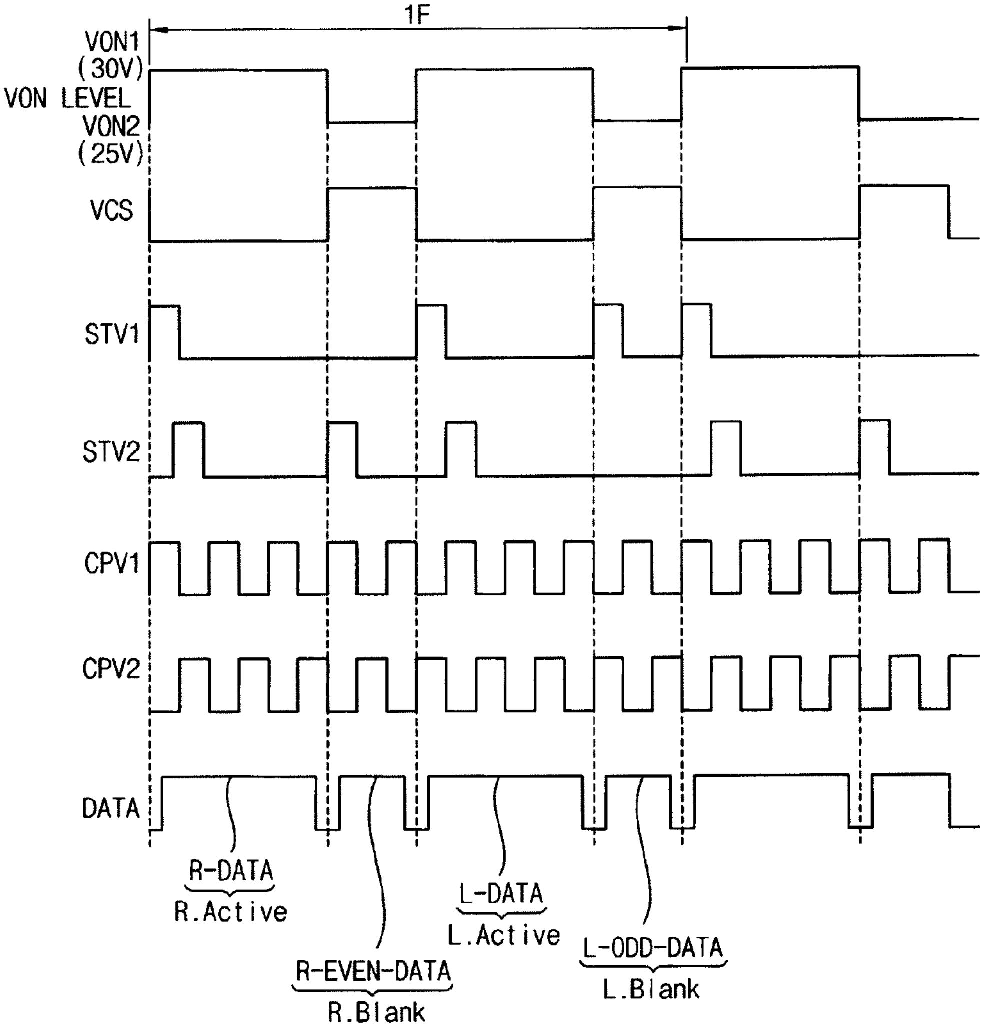
FIG. 7 is a timing diagram showing a method for driving a display apparatus, according to an exemplary embodiment of the present invention.

FIG. 7 is a timing diagram showing a method for driving a display apparatus, according to an exemplary embodiment of the present invention.

Referring to FIG. 7, the display panel 100 is driven according to one frame 1F unit. The frame 1F includes a right image active period R_Active, a right image blank period R_Blank, a left image active period L_Active and a left image blank period L_Blank in sequence. However, the frame 1F may include the left image active period L_Active, the left image blank period L_Blank, the right image active period R_Active and the right image blank period R-Blank in sequence.

For example, the right image active period R_Active and the left image active period L_Active are driven by 180 Hz, so that right and left images may be displayed for about 5.56 ms. In addition, the right image blank period R_Blank and the left image blank period L_Blank are driven by 360 Hz, so that right and left images may be displayed for about 2.78 ms. Thus, the frame 1F is driven by 60 Hz. However, a driving frequency of the frame 1F is not limited thereto, as many modifications are possible.

Referring to FIGS. 1 and 7, the voltage generator 300 receives the gate-on control signal VCS.

During the right image active period R_Active, the voltage generator 300 receives the gate-on control signal VCS having the low level, and outputs the first gate-on voltage Von1 to the gate driving part 400 based on the gate-on control signal VCS. The gate driving part 400 receives the first and second scan starting signals STV1 and STV2, the first and second clock signals CPV1 and CPV2, and the first gate-on voltage Von1, generates gate signals in response thereto and applies the gate signals to the gate lines GL1~GL2$k$−1 and GL2$k$~GLm. The data driving part 500 outputs data of horizontal lines in synchronization with the gate signals. Thus, a right data R_DATA is displayed on the display panel 100.

Thereafter, during the right image blank period R_Blank, the voltage generator 300 receives the gate-on control signal VCS having the high level, and outputs the second gate-on voltage Von2 to the gate driving part 400 based on the gate-on control signal VCS. The gate driving part 400 receives the second scan starting signal STV2 (but not the first scan starting signal STV1), the first and second clock signals CPV1 and CPV2, and the second gate-on voltage Von2, generates gate signals in response thereto and applies the gate signals to the even-numbered gate lines GL2$k$. The data driving part 500 outputs data of even-numbered horizontal lines in synchronization with the even-numbered gate signals. Thus, an even-numbered right data R_even_DATA is displayed on the display panel 100.

Thereafter, during the left image active period L_Active, the voltage generator 300 receives the gate-on control signal VCS having the low level, and outputs the first gate-on voltage Von1 to the gate driving part 400 based on the gate-on control signal VCS. The gate driving part 400 receives the first and second scan starting signals STV1 and STV2, the first and second clock signals CPV1 and CPV2, and the first gate-on voltage Von1, generates gate signals in response thereto and applies the gate signals to the gate lines GL1~GL2$k$−1 and GL2$k$~GLm. The data driving part 500 outputs data of horizontal lines in synchronization with the gate signals. Thus, a left data L_DATA is displayed on the display panel 100.

Thereafter, during the left image blank period L_Blank, the voltage generator 300 receives the gate-on control signal VCS having the high level, and outputs the second gate-on voltage Von2 to the gate driving part 400 based on the gate-on control signal VCS. The gate driving part 400 receives the first scan starting signal STV1 (but not the second scan starting signal STV2), the first and second clock signals CPV1 and CPV2, and the second gate-on voltage Von2, generates gate signals in response thereto and applies the gate signals to the odd-numbered gate lines GL2$k$−1. The data driving part 500 outputs data of odd-numbered horizontal lines in synchronization with the odd-numbered gate signals. Thus, an odd-numbered left data L_odd_DATA is displayed on the display panel 100.

According to the present exemplary embodiment, the display apparatus 1000 is driven according to one frame unit, the frame unit including at least one blank period and at least one active period, wherein only odd-numbered data or even-numbered data are applied to the data lines during the blank period. Further, the type of numbered data applied during a subsequent blank period is different from that applied during a prior blank period. Additionally, a gate-on voltage applied during the blank period is lower than that during the active period.

Thus, the impact of a charging rate difference is prevented by applying only odd-numbered data or even-numbered data to the data lines during the blank period, thereby preventing data output during the active period from being overlapped with data output during the blank period. Thus, a display quality of an image may be improved.

Figure 8:
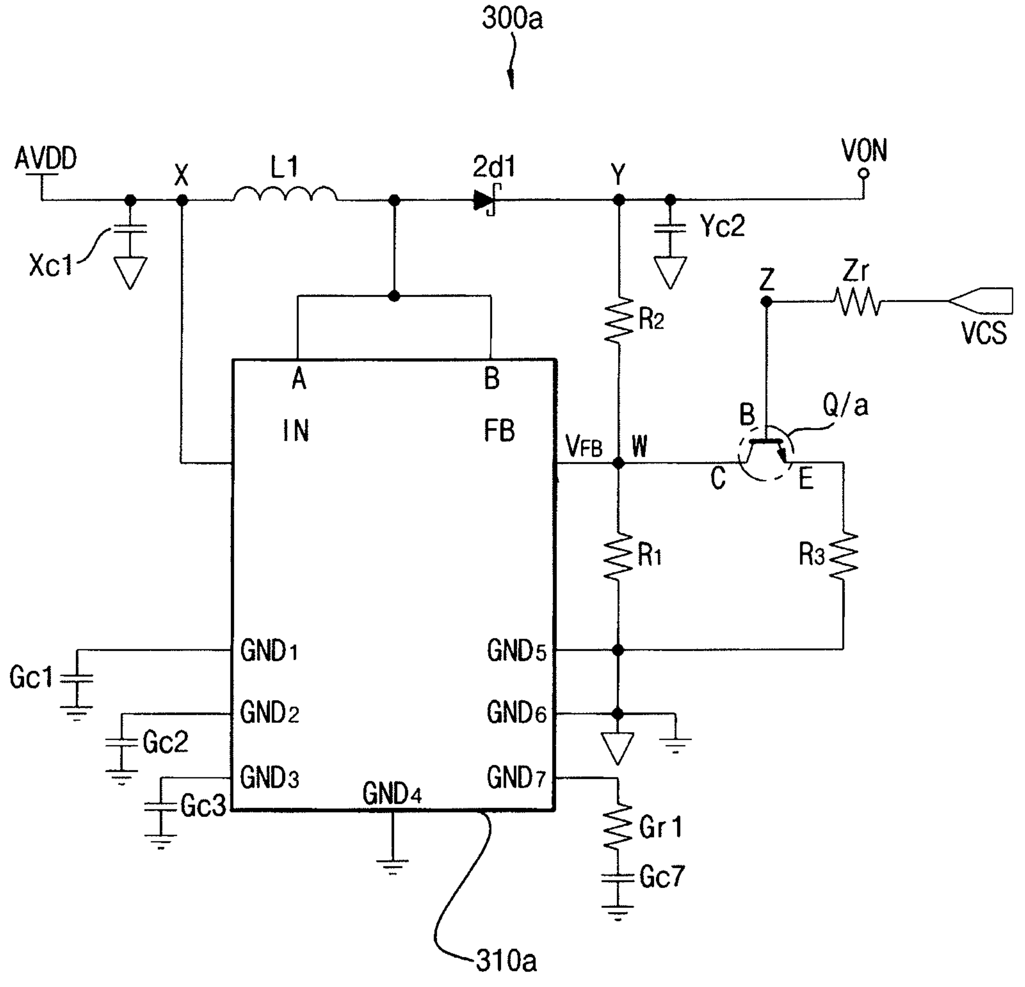
FIG. 8 is a circuit diagram illustrating a voltage generator according to an exemplary embodiment of the present invention.

FIG. 8 is a circuit diagram illustrating a voltage generator according to an exemplary embodiment of the present invention.

The exemplary embodiment of the present invention illustrated in FIG. 8 will be described with reference to certain of the exemplary embodiments of the present invention illustrated in FIGS. 1 to 7 except that a voltage generator 300$a$ shown in FIG. 8 replaces the voltage generator 300 of FIG. 2. Thus, the same reference numbers will be used hereafter to refer to the same or like parts discussed below, and any further repetitive explanation concerning the above elements will be omitted.

Referring to FIG. 8, the voltage generator 300$a$ includes a transforming element 310$a$, a switching element Q1$a$ and first, second and third resistors R1, R2 and R3.

An input terminal IN of the transforming element 310$a$ is connected to a first node X, and an output terminal FB of the transforming element 310$a$ is connected to a third node W. A first end of the first resistor R1 is connected to the third node W, and a second end the first resistor R1 is connected to a ground terminal GND of the transforming element 310$a$. A first end of the second resistor R2 is connected to the third node W, and a second end of the second resistor R2 is connected to a second node Y. A first end of the third resistor R3 is connected to an output terminal E of the switching element Q1$a$, and a second end of the third resistor R3 is connected to one of the plurality of ground terminals GND1-GND7 of the transforming element 310*a*. A control terminal B of the switching element Q1*a* is connected to a fourth node Z, and an input terminal C of the switching element Q1*a* is connected to the third node W. The first node X is connected to a power voltage AVDD terminal with a capacitor Xc1 therebetween, and the second node Y is connected to a gate-on voltage VON output terminal with a capacitor Yc2 therebetween. The fourth node Z is connected to a gate-on control signal VCS input terminal with a resistor Zr therebtween. Between the nodes X and Y is an inductor L1 and a zener diode zd1 and a node between the inductor L1 and the zener diode zd1 is connected to terminals A and B of the transforming element 310*a*. The ground terminals GND1-GND3 are connected to earth ground via capacitors Gc1-Gc3, respectively, the ground terminal GND4 is connected to earth ground, the ground terminals GND5 and GND6 are connected to earth and signal ground and the ground terminal GND7 is connected to earth ground via a resistor Gr1 and a capacitor Gc7.

Referring to FIG. 8, during the right and left image active periods R_Active and L_Active, the gate-on control signal VCS having the low level is inputted to the voltage generator 300*a*. Thus, the switching element Q1*a* is turned off, so that the first and second resistors R1 and R2 are connected in series. Thus, the first gate-on voltage Von1 outputted through the gate-on voltage VON output terminal is represented by the following Equation 1:

$$V_{on1} = V_{FB}\left(1 + \frac{R_2}{R_1}\right) \quad \text{(Equation 1)}$$

For example, the first gate-on voltage Von1 may be about 30V. Thus, the power voltage AVDD, an output $V_{FB}$ of the transforming element 310*a* and the first and second resistors R1 and R2 may be controlled by considering the first gate-on voltage Von1.

The first gate-on voltage Von1 is provided to the gate driving part 400 during the right and left image active periods R_Active and L_Active.

During the right and left image blank periods R_Blank and L_Blank, the gate-on control signal VCS is inputted to the voltage generator 300*a*. Thus, the switching element Q1*a* is turned on, so that the first and third resistors R1 and R3 are connected in parallel. Thus, the second gate-on voltage Von2 outputted through the gate-on voltage VON output terminal is represented by the following Equation 2:

$$V_{on2} = V_{FB}\left(1 + \frac{R_2}{R_1 // R_3}\right) \quad \text{(Equation 2)}$$

For example, the second gate-on voltage Von2 may be about 25V. Thus, the power voltage AVDD, an output $V_{FB}$ of the transforming element 310*a* and the first, second and third resistors R1-R3 may be controlled by considering the second gate-on voltage Von2.

The second gate-on voltage Von2 is provided to the gate driving part 400 during the right and left image blank periods R_Blank and L_Blank.

According to the present exemplary embodiment, the display apparatus 1000 may include the voltage generator 300*a* and be driven by one frame unit in the manner discussed above for FIG. 7 to prevent the difference in the charging rates of the odd-numbered and even-numbered gate lines from impacting data display, thereby enabling the display apparatus 1000 to display images of high quality.

As mentioned above, according to the exemplary embodiments of the present invention, a gate-on voltage applied during the blank period is lower than a gate-on voltage applied during the active period. Thus, by applying only odd-numbered data or even-numbered data during the blank period the impact of a charging rate difference of the gate lines may be prevented thereby preventing data output during the active period from being overlapped with data output during the blank period. Thus, a display quality of an image may be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of driving a display panel, the method comprising:

outputting odd-numbered and even-numbered gate signals having a first gate-on voltage during a first period;

outputting first data of odd-numbered and even-numbered horizontal lines in response to the odd-numbered and even-numbered gate signals having the first gate-on voltage;

outputting odd-numbered or even-numbered gate signals having a second gate-on voltage during a second period, wherein the second gate-on voltage is lower than the first gate-on voltage; and outputting second data of the odd-numbered horizontal lines in response to the odd-numbered gate signals having the second gate-on voltage, or outputting second data of the even-numbered horizontal lines in response to the even-numbered gate signals having the second gate-on voltage, wherein the second period corresponds to a first blank period, and when the odd-numbered gate signals having the second gate-on voltage and the second data of the odd-numbered horizontal lines are outputted during the first blank period, the even-numbered gate signals having the second gate-on voltage and the second data of the even-numbered horizontal lines are outputted during a second blank period, or when the even-numbered gate signals having the second gate-on voltage and the second data of the even-numbered horizontal lines are outputted during the first blank period, the odd-numbered gate signals having the second gate-on volae and the second data of the odd-numbered horizontal lines are outputted during the second blank period.

2. The method of claim 1, wherein the first data of the odd-numbered and even-numbered horizontal lines is image data for a left eye or image data for a right eye.

3. The method of claim 2, wherein the second data of the odd-numbered or even-numbered horizontal lines is image data for the left eye when the first data of the odd-numbered and even-numbered horizontal lines is image data for the left eye, and the second data of the odd-numbered or even-numbered horizontal lines is image data for the right eye when the first data of the odd-numbered and even-numbered horizontal lines is image data for the right eye.

4. The method of claim 1, further comprising:

generating the first gate-on voltage and the second gate-on voltage based on a gate-on voltage control signal.

5. The method of claim 4, wherein generating the first gate-on voltage and the second gate-on voltage comprises:

generating the first gate-on voltage in response to the gate-on voltage control signal having a first level; and generating the second gate-on voltage in response to the gate-on voltage control signal having a second level.

6. The method of claim 5, wherein generating the first gate-on voltage and the second gate-on voltage comprises:

receiving a first power voltage and amplifying the first power voltage to the first gate-on voltage in response to the gate-on voltage control signal having the first level; and receiving a second power voltage and amplifying the second power voltage to the second gate-on voltage in response to the gate-on voltage control signal having the second level, wherein the second power voltage is lower than the first power voltage.

7. The method of claim 5, wherein generating the first gate-on voltage and the second gate-on voltage comprises:

dividing a power voltage to generate the first gate-on voltage in response to the gate-on voltage control signal having the first level; and dividing the power voltage to generate the second gate-on voltage in response to the gate-on voltage control signal having the second level.

8. A display apparatus, comprising:

a display panel comprising a plurality of odd-numbered and even numbered gate lines and a plurality of data lines crossing the odd-numbered and even-numbered gate lines;

a gate driving part; and a data driving part, wherein, during a first period, the gate driving part outputs odd-numbered and even-numbered gate signals to the odd-numbered and even-numbered gate lines, respectively, wherein the odd-numbered and even-numbered gate signals have a first gate-on voltage, and during a second period, the gate driving part outputs odd-numbered gate signals to the odd-numbered gate lines or even-numbered gate signals to the even-numbered gate lines, wherein the odd-numbered or even-numbered gate signals output during the second period have a second gate-on voltage lower than the first gate-on voltage, and wherein during the first period, the data driving part outputs first data of odd-numbered and even-numbered horizontal lines to the data lines in response to the odd-numbered and even-numbered gate signals having the first gate-on voltage, and during the second period, the data driving part outputs second data of the odd-numbered horizontal lines to the data lines in response to the odd-numbered gate signals having the second gate-on voltage, or outputs second data of the even-numbered horizontal lines to the data lines in response to the even-numbered gate signals having the second gate-on voltage, wherein the second period corresponds to a first blank period, and when the odd-numbered gate signals having the second gate-on voltage and the second data of the odd-numbered horizontal lines are outputted during the first blank period, the even-numbered gate signals having the second gate-on voltage and the second data of the even-numbered horizontal lines are outputted during a second blank period, or when the even-numbered gate signals having the second gate-on voltage and the second data of the even-numbered horizontal lines are outputted during the first blank period, the odd-numbered gate signals having the second gate-on voltage and the second data of the odd-numbered horizontal lines are outputted during the second blank period.

9. The display apparatus of claim 8, wherein the first data of the odd-numbered and even-numbered horizontal lines and the second data of the odd-numbered or even-numbered horizontal lines is image data for a left eye or image data for a right eye.

10. The display apparatus of claim 8, further comprising a timing controller outputting a gate-on voltage control signal controlling a level of the first and second gate-on voltages.

11. The display apparatus of claim 10, further comprising a voltage generator generating the first and second gate-on voltages based on the gate-on voltage control signal.

12. The display apparatus of claim 11, wherein the voltage generator generates the first gate-on voltage in response to the gate-on voltage control signal having a first level, and generates the second gate-on voltage in response to the gate-on voltage control signal having a second level.

13. The display apparatus of claim 12, wherein the voltage generator comprises a power voltage selector receiving a first power voltage in response to the gate-on voltage control signal having the first level, and receiving a second power voltage in response to the gate-on voltage control signal having the second level.

14. The display apparatus of claim 13, wherein the power voltage selector comprises a first switching element, and the first switching element receives the second power voltage in response to the gate-on voltage control signal.

15. The display apparatus of claim 13, wherein the power voltage selector comprises a power controller that cuts off the first power voltage in response to the gate-on voltage control signal having the second level.

16. The display apparatus of claim 13, wherein the voltage generator comprises an amplifier amplifying the first or second power voltages received from the power voltage selector and generating the first or second gate-on voltages.

17. The display apparatus of claim 12, wherein the voltage generator comprises first and second resistors connected in series, and in response to the gate-on voltage control signal having the first level, the voltage generator divides a power voltage to generate the first gate-on voltage using the first and second resistors.

18. The display apparatus of claim 17, wherein the voltage generator further comprises:

a third resistor; and a second switching element selectively connecting the third resistor to the first resistor in parallel in response to the gate-on voltage control signal.

19. The display apparatus of claim 18, wherein in response to the gate-on voltage control signal having the second level, the voltage generator divides the power voltage to generate the second gate-on voltage using the third resistor and the first resistor connected in parallel and the second resistor.

20. A method of driving a display panel, the method comprising:

outputting, during a first active period of a frame, first gate signals to a first group of gate lines and second gate signals to a second group of gate lines, wherein the first and second gate signals have a first voltage level;

outputting, from a data driving part during the first active period, first data of first and second groups of horizontal lines in response to the first and second gate signals having the first voltage level;

outputting, during a first blank period of the frame, third gate signals to the first group of gate lines, wherein the third gate signals have a second voltage level that is lower than the first voltage level; and outputting, from the data driving part during the first blank period, only second data of the first group of horizontal lines in response to the third gate signals having the second voltage level.

21. The method of claim 20, wherein when the first group of gate lines is odd-numbered gate lines, the second group of gate lines is even-numbered gate lines and the first group of horizontal lines is odd-numbered horizontal lines and when the first group of gate lines is even-numbered gate lines, the second group of gate lines is odd-numbered gate lines and the first group of horizontal lines is even-numbered horizontal lines.

22. The method of claim 20, wherein the frame includes the first active period, the first blank period, a second active period and a second blank period in sequence and only second data of the second group of horizontal lines is output from the data driving part during the second blank period.

* * * * *